(12) United States Patent
Bahramgiri et al.

(10) Patent No.: US 12,046,045 B2
(45) Date of Patent: Jul. 23, 2024

(54) SYSTEMS AND METHODS FOR TRAILER HITCH BALL POSITION AND HITCH ANGLE

(71) Applicant: Ford Global Technologies, LLC, Dearborn, MI (US)

(72) Inventors: Mojtaba Bahramgiri, Dearborn, MI (US); Saeid Nooshabadi, Gilroy, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 17/570,097

(22) Filed: Jan. 6, 2022

(65) Prior Publication Data
US 2023/0215183 A1 Jul. 6, 2023

(51) Int. Cl.
*G06K 9/00* (2022.01)
*G06T 7/20* (2017.01)
*G06T 7/70* (2017.01)
*G06T 7/80* (2017.01)
*G06V 10/25* (2022.01)
(Continued)

(52) U.S. Cl.
CPC ............... *G06V 20/56* (2022.01); *G06T 7/20* (2013.01); *G06T 7/70* (2017.01); *G06T 7/80* (2017.01); *G06V 10/25* (2022.01); *G06V 10/82* (2022.01); *G06V 20/46* (2022.01); *G06T 2207/20081* (2013.01); *G06T 2207/20084* (2013.01); *G06T 2207/30252* (2013.01); *G06T 2210/12* (2013.01)

(58) Field of Classification Search
None
See application file for complete search history.

(56) References Cited

U.S. PATENT DOCUMENTS

| 9,156,496 | B2 | 10/2015 | Greenwood et al. |
| 10,984,553 | B2 | 4/2021 | Ramirez Llanos |
| (Continued) | | | |

*Primary Examiner* — S J Park
(74) *Attorney, Agent, or Firm* — Frank Lollo; Eversheds Sutherland (US) LLP

(57) ABSTRACT

The disclosure is generally directed to systems and methods for trailer hitch ball position location including receiving a plurality of image frames from a camera directed at a front of a trailer coupled to a vehicle at a coupling point, modeling the image frames in a convolutional neural network to form an initial estimate of a pivot point position as a location, optimizing the model using a nonlinear equation to identify the pivot point position, and locating the coupling point as the optimized pivot point position. The convolutional neural network includes a plurality of bounding boxes centered as locations of predetermined markers on the front of the trailer, the modeling via a reverse pinhole projection of a pixel onto a three-dimensional coordinate frame projected on a trailer plane to enable computed marker positions to determine relative dimensions of the trailer and locate the coupling point. The optimizing includes solving a nonlinear least-squares (NLLSQ) optimization formulation for multiple markers on the trailer. The method include the use of geometrical means to determine the angle of articulation between the trailer and tow-vehicle (hitch angle) by tracking the plurality of bounding boxes centered as locations of predetermined markers on the front of the trailer, as the vehicle and trailer move in a circular arc with respect to each other.

20 Claims, 8 Drawing Sheets

(51) Int. Cl.
*G06V 10/82* (2022.01)
*G06V 20/40* (2022.01)
*G06V 20/56* (2022.01)

(56) References Cited

U.S. PATENT DOCUMENTS

| | | | |
|---|---|---|---|
| 11,030,476 B2 | 6/2021 | Xu et al. | |
| 11,050,933 B2 | 6/2021 | Chen et al. | |
| 2019/0016264 A1* | 1/2019 | Potnis | G06N 3/08 |
| 2020/0130582 A1 | 4/2020 | Wong et al. | |
| 2022/0084212 A1* | 3/2022 | Dahal | G06N 3/08 |

* cited by examiner

SYSTEMS AND METHODS FOR TRAILER HITCH BALL POSITION AND HITCH ANGLE

BACKGROUND

Despite significant developmental efforts in automation, driver assisted features for maneuvering with a trailer require accurate estimations of the location of a hitch ball. The location of the hitch ball is important for trailer angle detection (TAD) and other driver assist features for maneuvering a vehicle with a trailer, such as backup assistance.

It is desirable to provide solutions that provide hitch ball position information and associated hitch angle information after a vehicle is hitched to a trailer.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
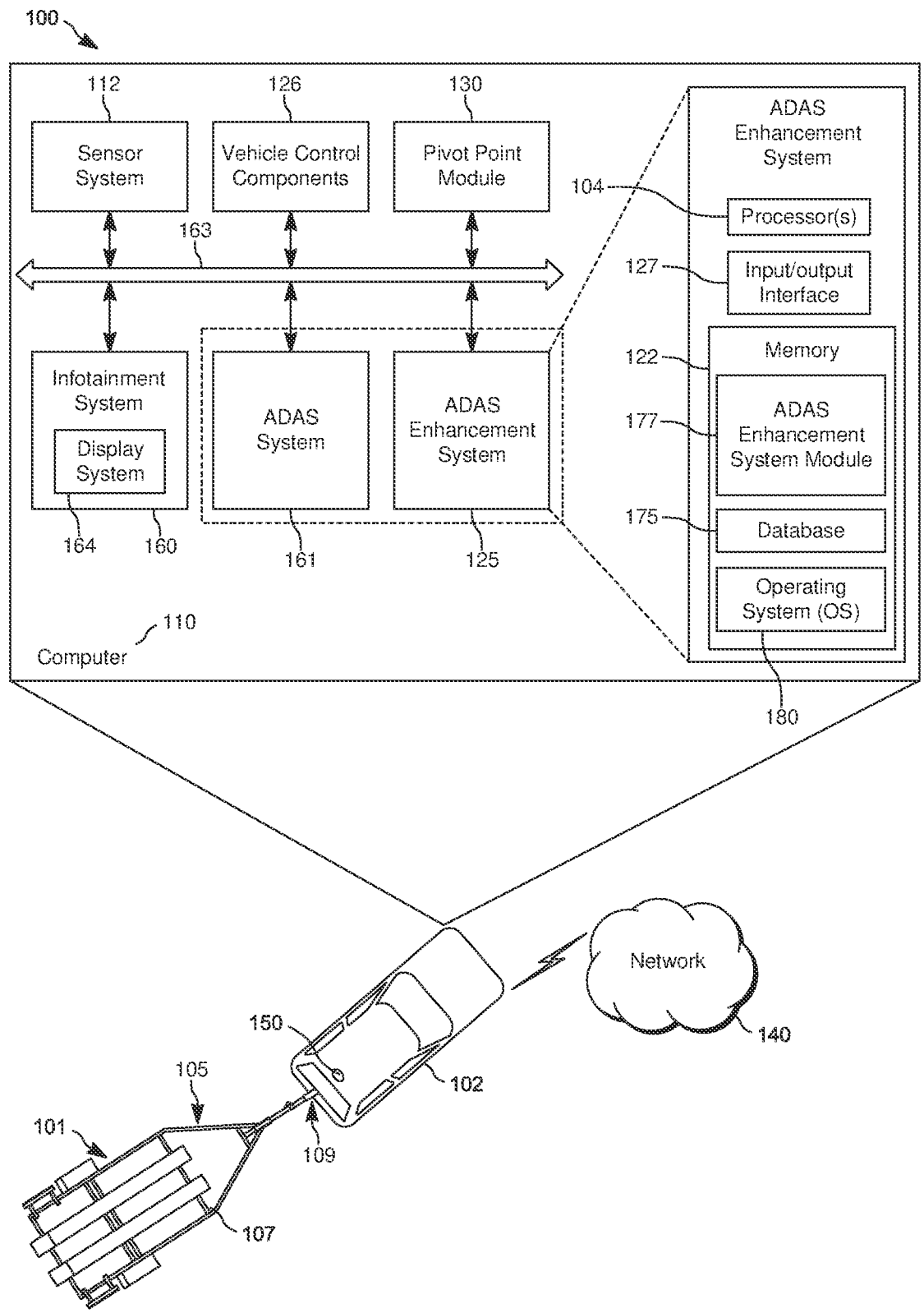
FIG. 1 illustrates an example system that includes a vehicle configured with a trailer hitch and camera in accordance with an embodiment of the disclosure.

This disclosure generally relates to vehicles, and more particularly relates to systems and methods for estimating of trailer hitch ball location and a hitch angle. That is, in terms of a general overview, this disclosure is generally directed to systems and methods for estimation of vehicle hitch ball location and hitch-angle estimation. An example method includes receiving a plurality of image frames from a camera directed at a front of a trailer coupled to a vehicle at a coupling point, modeling the image frames in a convolutional neural network to form an initial estimate of a pivot point position as a location, optimizing the model using a nonlinear equation to identify the pivot point position, and locating the coupling point as the optimized pivot point position. The same model is used to estimate the angle of articulation (hitch angle) between the trailer and the vehicle.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device, technique, or component may be performed by another device, technique or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment events. The level of human intervention is very low. Level 5 (L5) vehicles are fully autonomous vehicles that do not involve human participation.

FIG. 1 illustrates an example system 100 that includes a trailer 101 hitched to a vehicle 102 in accordance with an embodiment of the disclosure. Trailer 101 may include trailer marker lights 105 and 107 and be coupled to vehicle 102 via a hitch ball at pivot point 109. The vehicle 102 may be one of various types of vehicles with a chassis and may be a gasoline powered vehicle, an electric vehicle, a hybrid electric vehicle, or an autonomous vehicle, that is configured as a Level 2 or higher automated or semi-automated vehicle. The system 100 may be implemented in a variety of ways and can include various types of devices. For example, the example system 100 can include some components that are a part of the vehicle 102. The components that can be a part of the vehicle 102 can include a vehicle on-board computer 110, and a sensor system 112 coupled to cameras, such as camera 150 coupled to the vehicle 102. The camera may be any suitable camera coupled or associated with the vehicle. Thus, on-board computer 110 may be coupled to vehicle 102 chassis, the on-board computer including at least a memory and a processor, such as memory 122 and processor 104 coupled to the memory wherein the processor 104 is configured to determine a pivot point 109 when vehicle 102 is coupled by a hitch.

The vehicle on-board computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.).

The vehicle computer on-board 110, in one or more embodiments, may be used to support features such as passive keyless operations, remotely-controlled vehicle maneuvering operations, and remote vehicle monitoring operations. Vehicle on-board computer 110 may further control some maneuvers performed by the vehicle 102 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation). Some of the features available regarding hitch assist and maneuvering assist require knowledge of the location of the hitch ball or pivot/coupling point 109 after the hitch ball is attached to a hitch and no longer visible. For example, if a driver is required to manually attach the hitch to the hitch ball and then uses trailer maneuvering assistance operations, the location of the hitch ball is required. In such cases, vehicle on-board computer 110 may execute certain operations associated with locating the hitch ball as a pivot point 109 where a hitch ball couples to a trailer, such as trailer 101.

The vehicle on-board computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.). In one or more embodiments, vehicle on-board computer 110 may enable a self-driving car or provide driver assistance. Thus, vehicle on-board computer 110 may further include an Advanced Driver-Assistance System ("ADAS") enhancement system 125 which is shown to further include, as one embodiment, the various components of the vehicle 102 that may be controlled, activated, and/or operated by the vehicle by the ADAS enhancement system 125. In one implementation, the ADAS enhancement system 125 can be an independent device (enclosed in an enclosure, for example). In another implementation, some or all components of the ADAS enhancement system 125 can be housed, merged, or can share functionality, with vehicle on-board computer 110. For example, an integrated unit that combines the functionality of the ADAS enhancement system 125 can be operated by a single processor and a single memory device. In the illustrated example configuration, the ADAS enhancement system 125 includes the processor 104, an input/output interface 127, and memory 122, ADAS Enhancement System Module 177, database 175 and operating system 180. The input/output interface 127 is configured to provide communications between the ADAS enhancement system 125 and other components such as the sensors 150 the vehicle control components and any infotainment system, if present. The memory 122, which is one example of a non-transitory computer-readable medium, may be used to store an operating system (OS) 180, a database 175, and various code modules such as an ADAS enhancement system module 177. The modules, including ADAS enhancement system module 177, may be provided in the form of computer-executable instructions that can be executed by processor 104 for performing various operations in accordance with the disclosure.

In one or more embodiments, communications network 140 includes a cellular or Wi-Fi communication link enabling vehicle 102 to communicate with network 140, which may include a cloud-based network or source for transferring data in accordance with this disclosure.

Vehicle 102 mounted camera 150 may further include a set of nodes and/or sensors mounted upon vehicle 102 in a manner that allows the vehicle on-board computer 110 to communicate with devices and collect data for coupling point estimation and hitch angle detection. Examples of may include sensors, radars and/or emitters capable of detecting objects, distances such as ultrasonic radar, LiDAR, cameras, and the like. In one or more embodiments, sensors/cameras may further include one or more of Bluetooth®-enabled sensors, or Bluetooth® low energy (BLE)-enabled sensors. In one embodiment, a single node and/or sensor and/or camera 150 may be mounted at the rear of the vehicle 102. Other sensors may also be present in vehicle 102 including wheel speed sensors, accelerometers, rate sensors, GPS sensors, and steering wheel sensors.

Vehicle on-board computer 110 includes pivot point module 130 to perform hitch ball location by collecting data from back up camera 150 on vehicle 102 or other sensors directed at the hitch ball location, pivot point 109. Vehicle on-board computer 110 further may control vehicle 102 using some maneuvers performed by the vehicle 102 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation).

Figure 2:
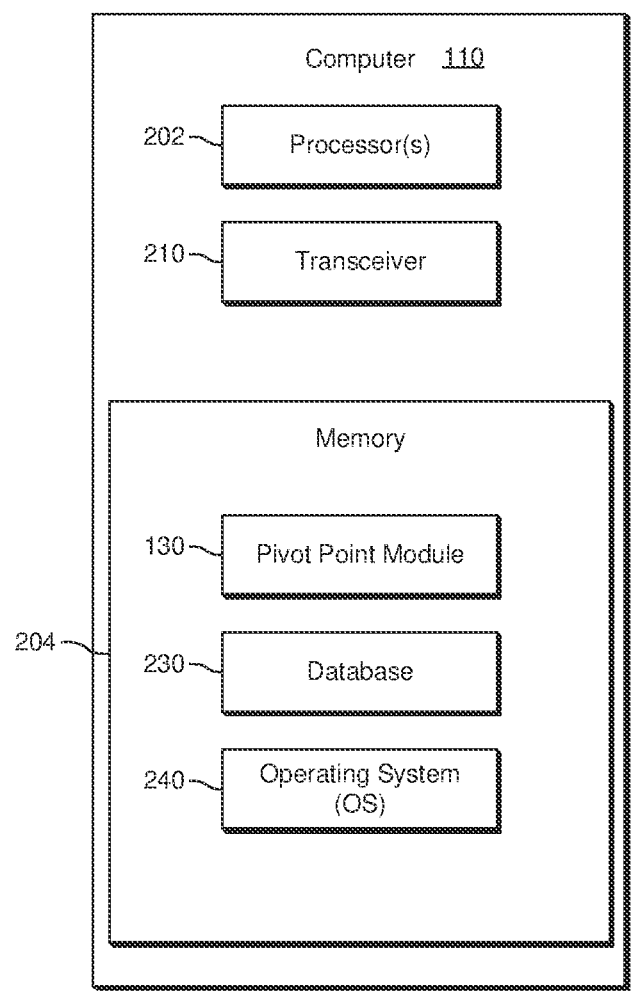
FIG. 2 illustrates some example functional blocks that may be included in a system for a vehicle in accordance with an embodiment of the disclosure.

Referring to FIG. 2, vehicle on-board computer 110 is shown configured to execute various operations associated with estimating the location of a hitch ball via pivot point module 130 in accordance with one or more embodiments.

As shown, in one embodiment, on-board computer 110 includes components such as processor 202, transceiver 210, and memory 204 which is one example of a non-transitory computer-readable medium, may be used to store the operating system (OS) 240, database 230, and various modules such as pivot point module 130. One or more modules in the form of computer-executable instructions may be executed by the processor 210 for performing various operations in accordance with the disclosure. More particularly, pivot point module 130 may be executed by the processor 210 in accordance with the disclosure, for determining the location of pivot point 109 which identifies the location of a hitch ball for connecting vehicle 102 to a trailer.

Referring back to FIG. 1, trailer 101 and vehicle 102 are shown in a hitched position with pivot point 109. According to an embodiment, hitch ball location is determined regardless of whether vehicle 102 is in motion but while trailer 101 is connected. More specifically, according to embodiments, deep learning object detection and tracking models apply to detect and track marker lights or other features located on trailer 101 front side such as marker lights 105 and 107. Although in some embodiments, the target feature may be marker lights 105 and 107, any feature shown on trailer 101 that is detectable and trackable by computer vision are appropriate for embodiments herein.

As shown on FIG. 1, sensors coupled to vehicle 102 include camera(s) 150. In one or more embodiments, the data received by camera(s) 150 may be provided to pivot point module 130 to determine a pivot point location after vehicle 102 and trailer 101 are coupled and/or moving. Before pivot point 109 can be located, however, a calibration procedure accounts for any distortion such as that caused by a wide angle or fisheye in camera 150. To accomplish a calibration procedure, OpenCV (Open Computer Vision) or any other appropriate toolbox to extract a camera's intrinsic matrix may be performed to normalize the corrected image data from trailer 101.

More particularly, compared to a normal lens (i.e. 50 mm focal length), typical camera(s) 150 may include a wide-angle fisheye lens to provide a large field-of-view that enables the capture of much larger area behind vehicle 102. The large curvature in the fisheye lens displaces the objects from their rectilinear positions. Thus, to correctly estimate the positions of the detected marker lights, a neural network model requires compensation for the distortion through calibration, when there is distortion caused by the mounted fisheye lens on the camera sensor 150.

Figure 3:
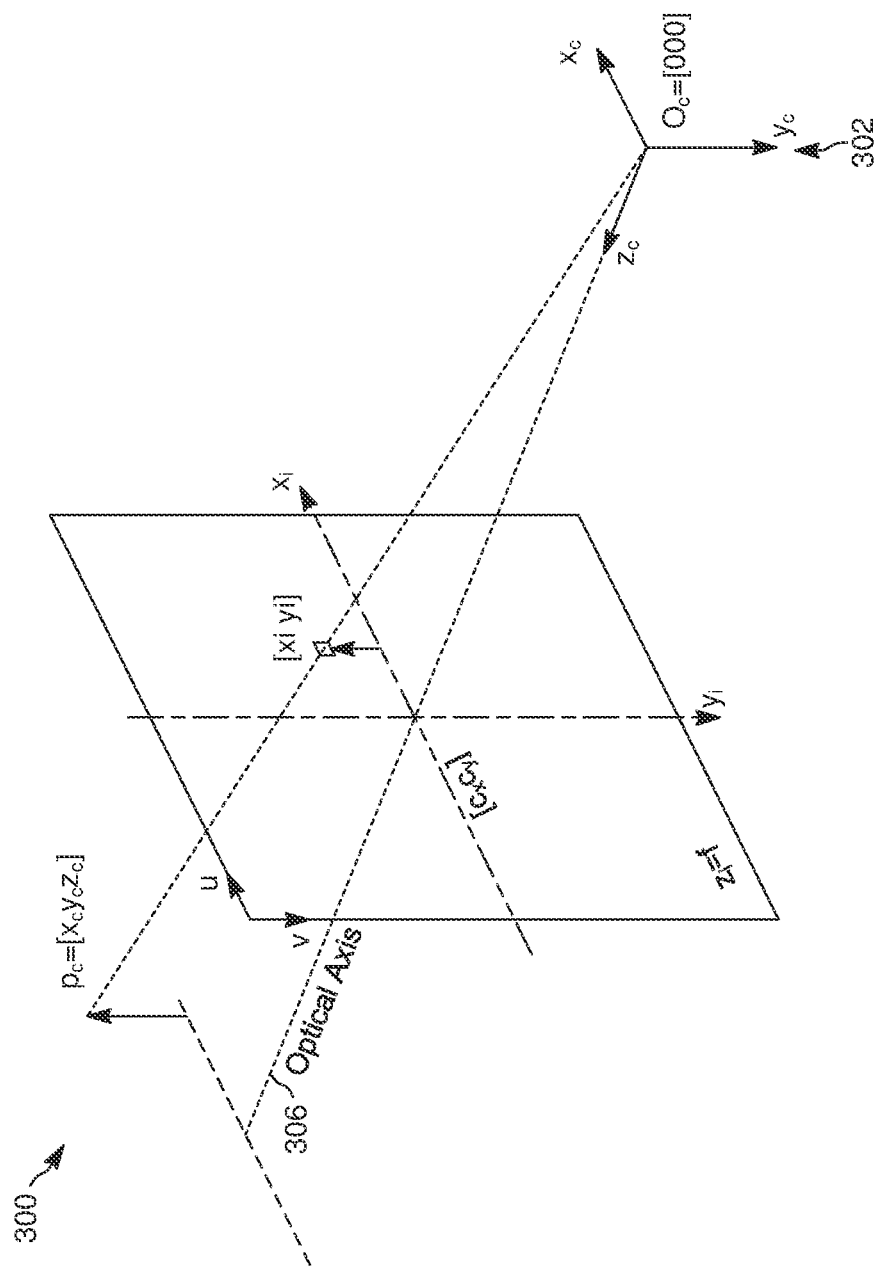
FIG. 3 illustrates a model of a camera pinhole projection in accordance with an embodiment of the disclosure.

After a calibration extracts a camera's intrinsic matrix, the matrix may be used in reverse pinhole projection. For example, as shown in FIG. 3, a model 300 of camera pinhole projection projects from an x, y, z coordinate space 302 with the z axis being an optical axis 306.

The calibrated camera data is applied to a plurality of image frames from camera/sensor 150 directed toward front of trailer 101 coupled to vehicle 102 at pivot point 109. In one or more embodiments, the plurality of image frames are collected over a rotation range relative to vehicle 102. After the plurality of image frames are collected, a convolutional neural network object detection technique may be used to locate the marker-lights on trailer 101 accurately and incorporate this location information to estimate a trailer articulation angle and the pivot point 109 for the hitch ball location. In some embodiments, an image regression model may be used or other standard features may be used to detect and track, such as a trailer front face or drawbar. As one of skill in the art may appreciate, marker lights 105 and 107 have significantly lower diversity in shape and color, and may be the basis for a universal model for locating the marker lights or other appropriate features.

After a model detects and extracts desired features of trailer 101, in an embodiment, the model projects them onto a trailer plane. For example in FIG. 4 a model 400 illustrates trailer plane 402, camera focal plane 404, camera 406 and horizontal line 408 to model location of hitch ball 410. Camera 406 takes images, and, in each image frame, a neural network model detects or tracks marker lights 105 and 107 shown in FIG. 1, or other features that are trained for marker light detection. In other embodiments an optical flow technique may apply. The neural network model or other model returns a bounding box center as a location of a marker light, at a time t: $[u_n^t \ v_n^t]^T$. Next as described above, if there is a fish eye or wide lens distortion, the neural network mitigates lens distortion with extracted camera intrinsic such that $[u_n^t \ v_n^t]^T = [\hat{u}_n^t \ \hat{v}_n^t]^T$.

Figure 4:
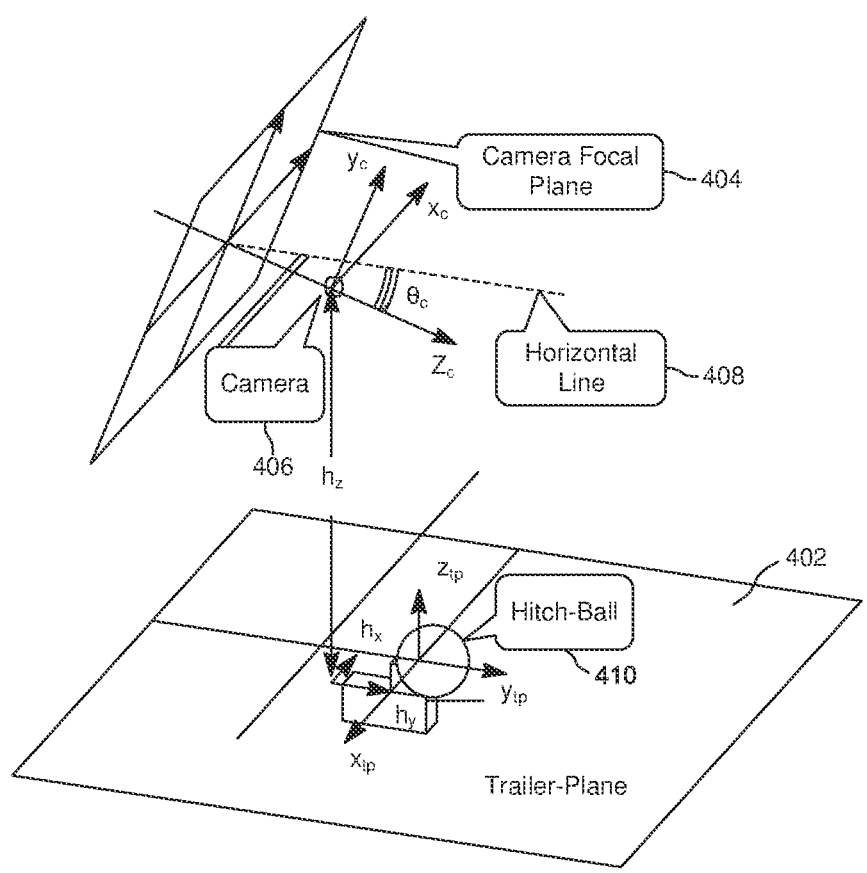
FIG. 4 illustrates a model of a trailer plane and a camera focal plane in accordance with an embodiment of the disclosure.

Next, the model considers an initial guess for pivot point 109 as $o_0 = [x_0 \ y_0]^T$. Referring to FIG. 4, as shown, the camera 406 is shown placed in relative position with respect to a hitch ball/pivot point location 410.

The plurality of image frames used for the neural network may be modeled in the convolutional neural network with a plurality of bounding boxes centered as locations of predetermined marker lights 105 and 107 on the front of trailer 101, the modeling the image frames via a reverse pinhole projection of a pixel onto a three dimensional coordinate frame projected on a trailer plane as shown in FIG. 4 enable computed marker light positions to be detected from the plurality of image frames and to determine relative dimensions of trailer 101 and locate the coupling point and also determine the angle of articulation. 109.

Thus, using $o_0$ the neural network model performs reverse pinhole projection as shown in FIGS. 3 and 4 such that $$[\hat{u}_n^t \hat{v}_n^t]^T \underset{\square}{\rightarrow} q_n^t := [x_n^t y_n^t]^T.$$

Thus, in one embodiment, the neural network model forms a set corresponding to each marker light, $Q_n$ where each set includes marker light position vectors $Q_n := \{q_n^t\} t$ In one embodiment, after a hitch ball is coupled to trailer 101, the location of the hitch-ball is a pivot point 109 of the trailer 101 rotational displacement relative to the tow-vehicle. Thus, regardless of the trailer orientation, the distances from marker-lights 105 and 107 to the hitch-ball and pivot point 109 are constant and equal to each other. The location of the hitch ball along the y direction is shown as $h_y$ on the trailer plane 302 in FIG. 4.

Thus, in accordance with an embodiment, an estimate of the trailer pivot point 109 is $ô = [h_x \ h_y]$ on the trailer plane 302 via a nonlinear least-squares optimization formulation (NLLSQ), as follows:

$$ô = \min_o f(o) = \min_o \frac{1}{2} \|r(o)\|^2 \text{ where } r(o) = [r^1(o), \dots, r^m(o)]^T,$$

-continued $$r'(o) = \overline{r^2} - \|o - q'\|^2, \text{ and } \overline{r^2} = \frac{1}{M}\sum_{t=1}^{M}\|o - q'\|^2,$$

where ô is the coupling point 109 on a trailer plane, and q represents estimates for a predetermined plurality of markers on the trailer 101.

In one or more embodiments, the NLLSQ optimization formula may be solved by numerical methods to solve the formula including solving a Jacobian matrix to converge on the pivot point 109. For example, one method includes solving a nonlinear equation, $$\nabla f(o_t) = J(o_t)^T r(o_t) = 0$$

Where $J(o_t)$ is the Jacobian matrix given as:

$$J(o_t) = \begin{bmatrix} \frac{dr_1(o_t)}{do_{t_x}} & \cdots & \frac{dr_1(o_t)}{do_{t_y}} \\ \vdots & \ddots & \vdots \\ \frac{dr_N(o_t)}{do_{t_x}} & \cdots & \frac{dr_N(o_t)}{do_{t_y}} \end{bmatrix} =$$

$$= 2\begin{bmatrix} (o_t(x) - q_1(x)) & \cdots & (o_t(y) - q_1(y)) \\ \vdots & \ddots & \vdots \\ (o_t(x) - q_N(x)) & \cdots & (o_t(y) - q_N(y)) \end{bmatrix}$$

Figure 5:
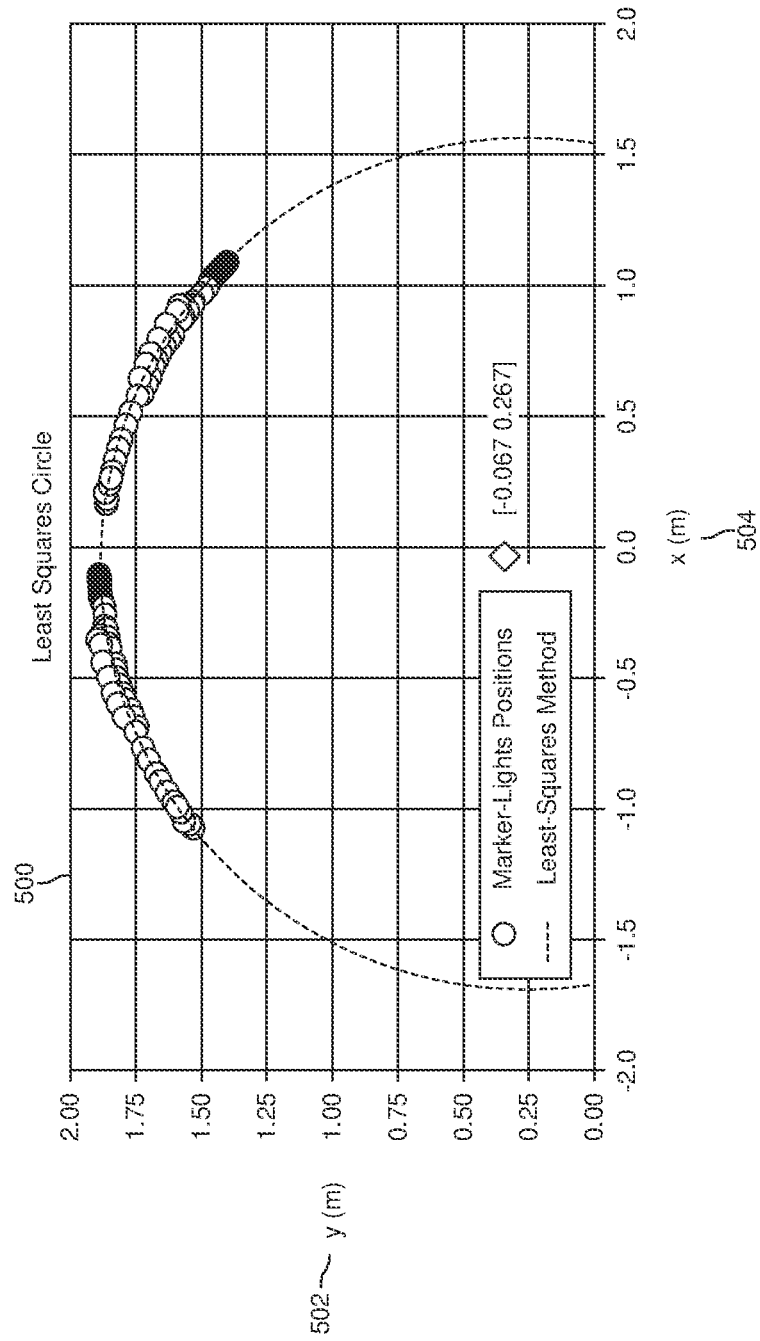
FIG. 5 illustrates a least squares circle in accordance with an embodiment of the disclosure.

Note that the formulas assume that the marker lights 105 and 107 are positioned symmetrically on trailer 101. The convolutional neural network or conventional tracking models detect and tracks each marker light independently in one embodiment and may record the estimated position over time. Regardless of the position on trailer 101, hitch-ball at pivot point 109 is the center of rotation. Therefore multiple tracked objects on trailer 101 can be used to expand the function. In one embodiment, an error function or array $r(o_t)$ of individually tracked objects and the Jacobian matrix are concatenated to provide more precise results. For example, if the marker lights are not precisely symmetrical, an error array can correct for the amount of difference. The center of rotation concept is illustrated in FIG. 5, wherein a Least Squares Circle illustrates where the marker light positions may be located on an x, y least squares circle with the detected marker light positions shown with y axis 502 in meters and x axis 504 in meters.

Figure 6:
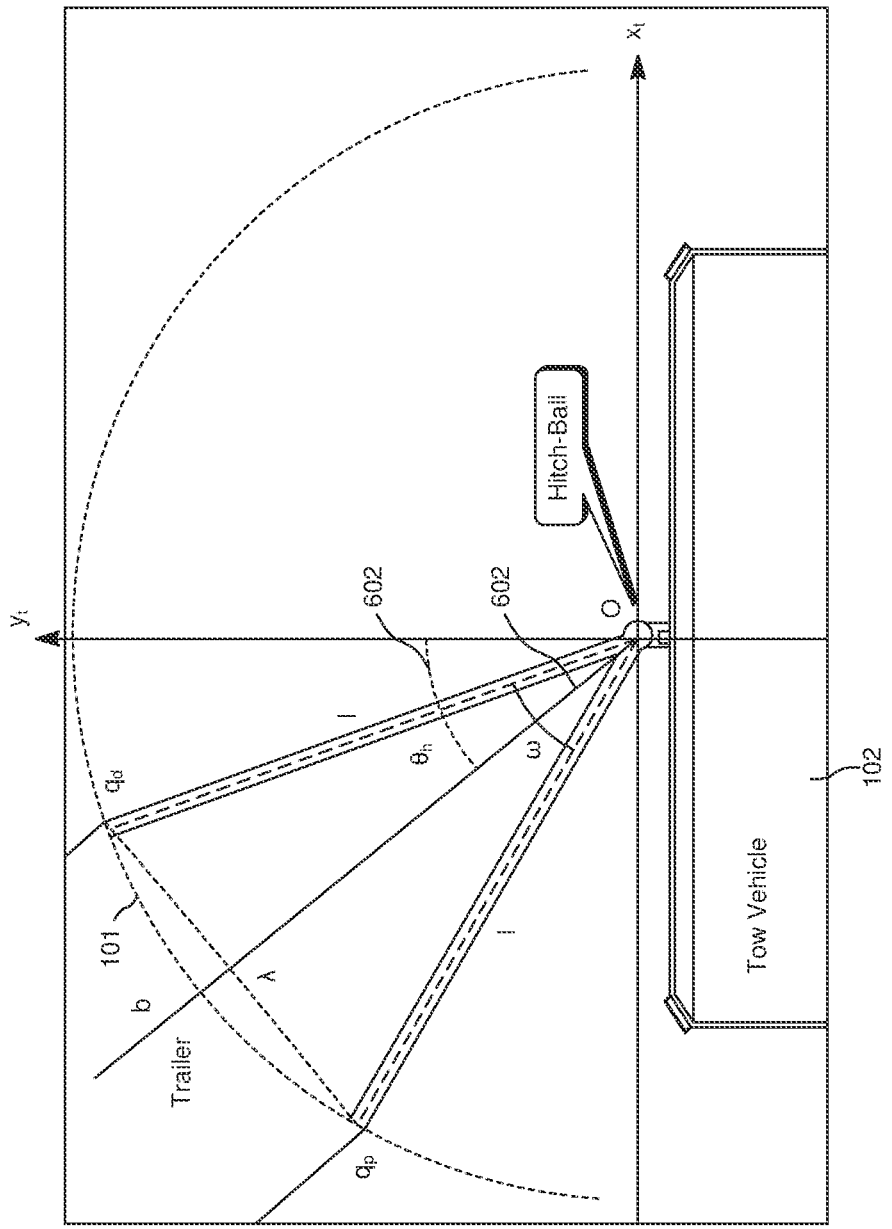
FIG. 6 illustrates a top view of a trailer and tow vehicle and a hitch angle in accordance with an embodiment of the disclosure.
Figure 7:
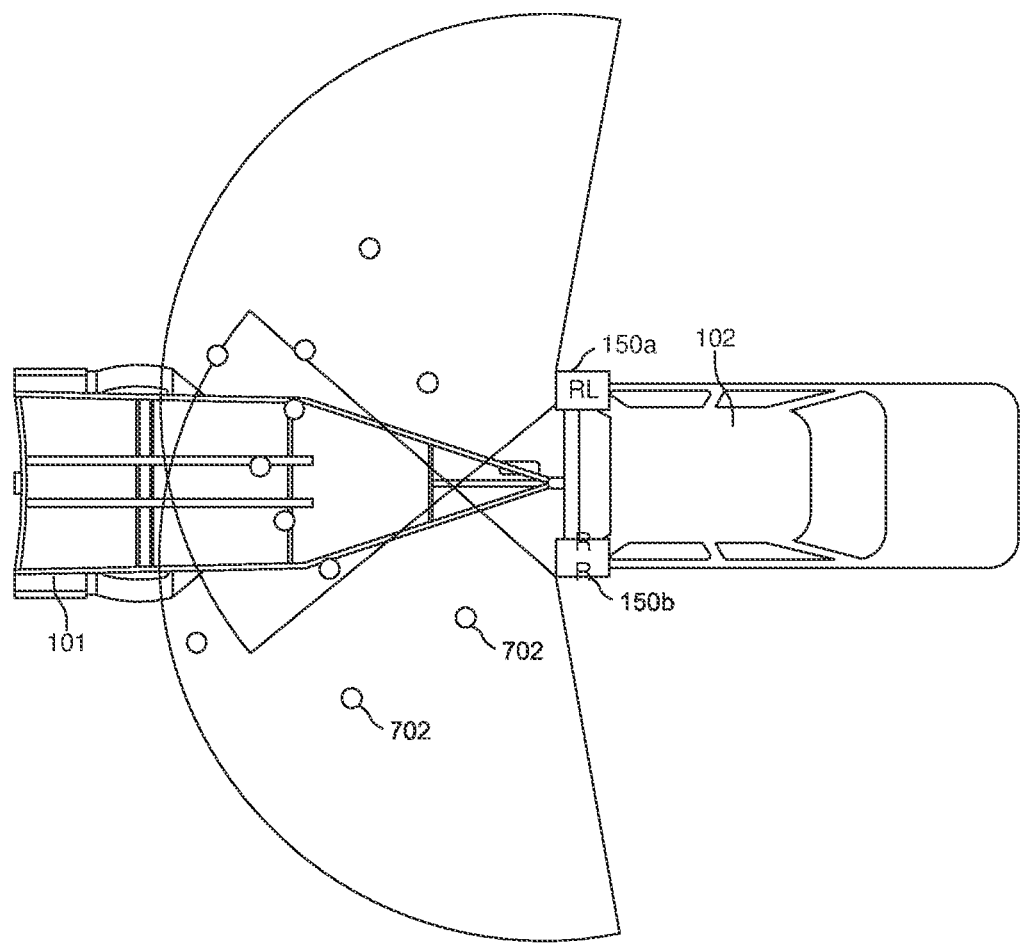
FIG. 7 illustrates a top view of a trailer and a tow vehicle configured to be sensitive enough to detect a trailer in accordance with an embodiment of the disclosure.

Referring to FIGS. 6 and 7 after the hitch ball is located, one embodiment provides for detecting the trailer angle in real time while the trailer is connected to vehicle 102. For example as shown in FIG. 1, and ADAS system can, in addition to camera, include radars used for blind spot information systems (BLIS) or the like would be beneficial for trailer angle detection with limited computation and not require high performance computing units for example. As shown in FIG. 6, vehicle 102 is coupled to trailer 101. More particularly, in an embodiment, hitch angles 602 are estimated using an estimated trailer dimension and the plurality of image frames collected using the camera 150 by estimating the hitch angle to pivot point 109 through geometrical means by tracking the plurality of bounding boxes centered as locations of predetermined markers on the front of the trailer, as the vehicle and trailer move in a circular arc with respect to each other as shown in FIG. 6.

Figure 8:
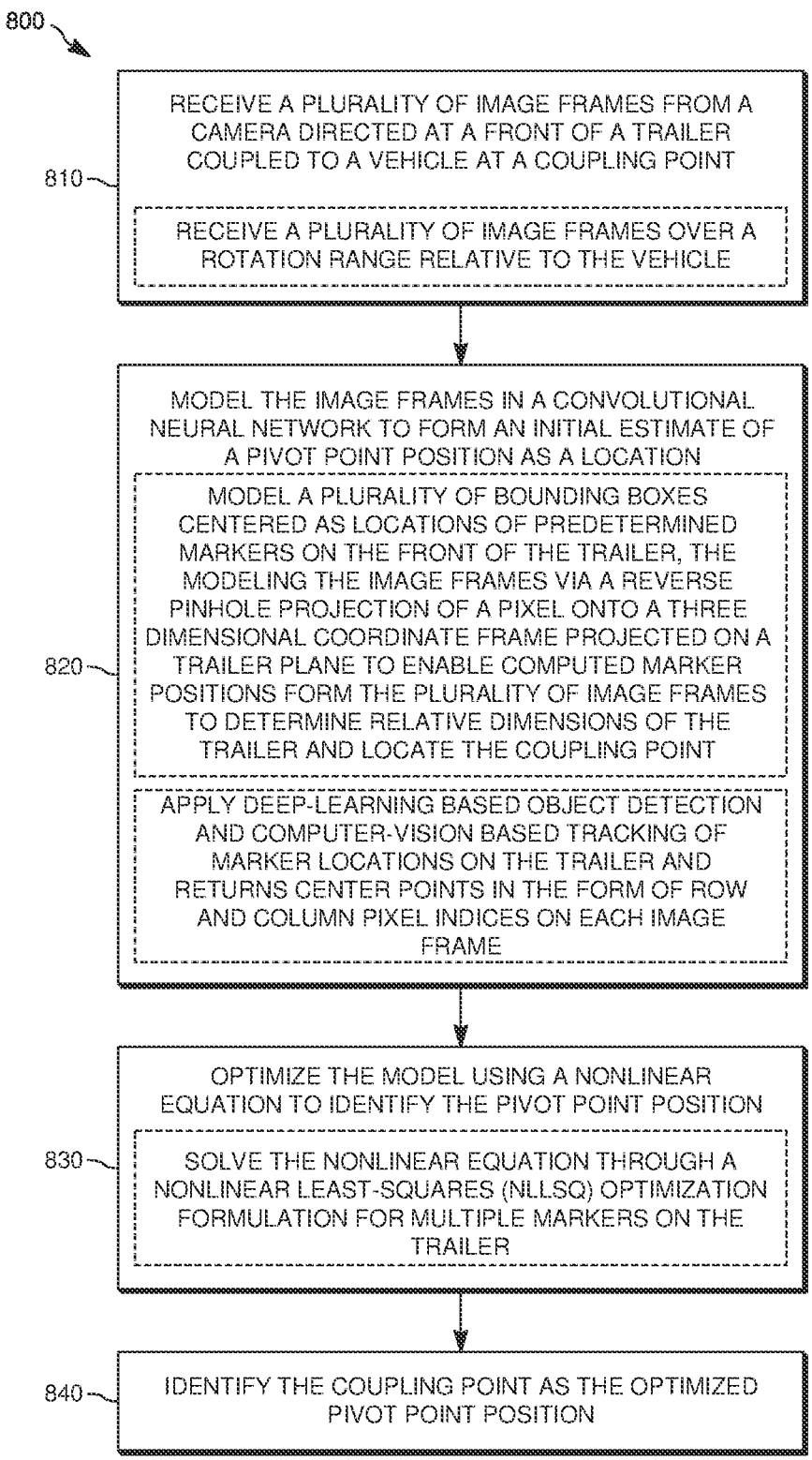
FIG. 8 illustrates a flow diagram of a method in accordance with an embodiment of the disclosure.

Referring now to FIG. 8, a flow diagram illustrates a method in accordance with an embodiment. As shown block 810 provides for receiving a plurality of image frames from a camera directed at a front of a trailer coupled to a vehicle at a coupling point. For example, network 140 or computer 110 may receive image frames from camera 150 located on vehicle 102 coupled to trailer 101. Within block 810 is block 8102 which provides for receiving the plurality of image frames over a rotation range relative to the vehicle.

Block 820 provides for modeling the image frames in a convolutional neural network to form an initial estimate of a pivot point position as a location. For example, a convolutional neural network such as those known in the art may use the image frames to Block 820 includes optional block 8202 which provides for modeling a plurality of bounding boxes centered as locations of predetermined markers on the front of the trailer, the modeling the image frames via a reverse pinhole projection of a pixel onto a three dimensional coordinate frame projected on a trailer plane to enable computed marker positions from the plurality of image frames to determine relative dimensions of the trailer and locate the coupling point. Block 820 further includes optional block 8204 which provides for applying deep-learning based object detection and computer-vision based tracking of marker locations on the trailer and returns center points in the form of row and column pixel indices on each image frame. For example, tracking marker lights 105, 107 as shown in FIG. 1 may be used to determine the trailer plane and enable the reverse pinhole projection as shown in FIG. 4.

Block 830 provides for optimizing the model using a nonlinear equation to identify the pivot point position. Block 830 includes optional block 8302 which provides for solving the nonlinear equation through a nonlinear least-squares (NLLSQ) optimization formulation for multiple markers on the trailer.

Block 840 provides for identifying the coupling point as the optimized pivot point position. For example, the optimized pivot point position is the point where the trailer hitch is coupled to vehicle 102.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving a plurality of image frames from a camera directed at a front of a trailer coupled to a vehicle at a coupling point;
modeling the image frames in a convolutional neural network to form an initial estimate of a pivot point position as a location;
optimizing the model using a nonlinear equation to identify the pivot point position; and
locating the coupling point as the pivot point position.

2. The method of claim 1 further comprising obtaining, using the pivot point position, an angle of articulation (hitch angle) between the trailer and the vehicle employing a tracking system that tracks marker points on a front of the trailer on a circular arc.

3. The method of claim 1, wherein receiving the plurality of image frames includes receiving the plurality of image frames over a rotation range relative to the vehicle.

4. The method of claim 1, wherein modeling the image frames in the convolutional neural network includes modeling in the convolutional neural network with a plurality of bounding boxes centered as locations of predetermined markers on the front of the trailer, wherein modeling the image frames comprises a reverse pinhole projection of a pixel onto a three dimensional coordinate frame projected on a trailer plane to enable computed marker positions from the plurality of image frames to determine relative dimensions of the trailer and locate the coupling point.

5. The method of claim 1 wherein the camera is situated on the vehicle, the plurality of image frames corrected for distortion when the camera includes a non-accurate wide-angle lens, the image frames corrected through lens calibration.

6. The method of claim 1 wherein modeling the image frames in the convolutional neural network includes applying deep-learning based object detection and computer-vision based tracking of marker locations on the trailer and returning center points as row and column pixel indices on each image frame.

7. The method of claim 1 wherein the optimizing includes solving the nonlinear equation through a nonlinear least-squares (NLLSQ) optimization formulation for multiple markers on the trailer by $$\hat{o} = \min_o f(o) = \Box \min_o \frac{1}{2}\|r(o)\|^2 \text{ where } r(o)[r^1(o), \ldots, r^m(o)]^T,$$

$$r^t(o) = \overline{r^2} - \|o - q^t\|^2, \text{ and } \overline{r^2} = \frac{1}{M}\sum_{t=1}^{M}\|o - q^t\|^2,$$

where ô is the coupling point on a trailer plane, and q represents estimates for a predetermined plurality of markers on the trailer.

8. The method of claim 7, wherein the NLLSQ optimization formula is solved by one or more numerical methods to solve the nonlinear equation, including solving a Jacobian matrix to converge on the coupling point.

9. The method of claim 8, wherein the Jacobian matrix is concatenated with an error array when the predetermined plurality of markers on the trailer are not positioned symmetrically on the trailer.

10. The method of claim 1, further comprising estimating a hitch angle, using an estimated trailer dimension and the plurality of image frames, between the vehicle and trailer with pivot point at an estimated location of a hitch ball of the vehicle using geometrical articulation and optimization techniques to determine.

11. A system for a vehicle comprising:
a memory that stores computer-executable instructions;
a processor configured to access the memory and execute the computer-executable instructions to:
receive a plurality of image frames from a camera directed at a front of the trailer coupled to the vehicle at a coupling point;
model the image frames in a convolutional neural network to form an initial estimate of a pivot point position as a location;
optimize the model using a nonlinear equation to identify the pivot point position;
locate the coupling point as the pivot point position; and
using geometrical articulation to estimate an instantaneous hitch angle for a combined moving vehicle and trailer based on a location of the pivot point position and a tracking system that tracks marker points on a front of the trailer on a circular arc.

12. The system of claim 11 wherein the processor is configured to execute instructions to receive the plurality of image frames over a rotation range from the camera, the camera being coupled to the vehicle.

13. The system of claim 11 wherein the processor is configured to execute instructions to model the image frames in the convolutional neural network with a plurality of bounding boxes centered as locations of predetermined markers on the front of the trailer, the modeling the image frames via a reverse pinhole projection of a pixel onto a three dimensional coordinate frame projected on a trailer plane to enable computed marker positions from the plurality of image frames to determine relative dimensions of the trailer and locate the coupling point.

14. The system of claim 11 wherein the processor is configured to execute instructions to process the plurality of image frames from the camera situated on the vehicle, the plurality of image frames corrected for distortion when the camera includes a non-accurate wide-angle lens, the image frames corrected through lens calibration.

15. The system of claim 11 wherein the processor is configured to execute instructions to model the image frames in the convolutional neural network by applying deep-learning based object detection and computer-vision based tracking of marker locations on the trailer and returning center points as row and column pixel indices on each image frame.

16. The system of claim 11 wherein the processor is configured to execute instructions to optimize the model by solving the nonlinear equation through a nonlinear least-squares (NLLSQ) optimization formulation for multiple markers on the trailer by $$\hat{o} = \min_o f(o) = \Box \min_o \frac{1}{2}\|r(o)\|^2 \text{ where } r(o)[r^1(o), \ldots, r^m(o)]^T,$$

$$r^t(o) = \overline{r^2} - \|o - q^t\|^2, \text{ and } \overline{r^2} = \frac{1}{M}\sum_{t=1}^{M}\|o - q^t\|^2,$$

where ô is the coupling point on a trailer plane, and q represents estimates for a predetermined plurality of markers on the trailer.

17. The system of claim 16 wherein the NLLSQ optimization formula is solved by one or more numerical methods to solve the nonlinear equation, including solving a Jacobian matrix to converge on the coupling point, the Jacobian matrix being concatenated with an error array when the predetermined plurality of markers on the trailer are not positioned symmetrically on the trailer.

18. The system of claim 11 wherein the processor is configured to execute instructions to estimate a hitch angle using an estimated trailer dimension and the plurality of image frames, using geometrical articulation and optimization techniques.

19. A vehicle comprising:
a chassis;
sensors coupled to the chassis, the sensors including one or more of a camera and an Advanced Driver Assistance System (ADAS) radar;
an on-board computer coupled to the chassis, the on-board computer including a memory and a processor coupled to the memory, the processor configured to access the memory and execute computer-executable instructions to:
  receive a plurality of image frames from the camera directed at a front of a trailer coupled to the vehicle;
  model the image frames in a convolutional neural network to form an initial estimate of a pivot point position where the vehicle is coupled to the trailer;
  optimize the model using a nonlinear equation to identify the pivot point position; and
  locate a coupling point as the pivot point position.

20. The vehicle of claim 19 wherein the processor is configured to execute instructions to estimate a hitch angle using the plurality of image frames and the pivot point position by geometrically calculating constants comprising distances and angles between the coupling point and a plurality of markers captured by the plurality of image frames.

* * * * *